United States Patent [19]
Yablonski et al.

[11] 3,824,870
[45] July 23, 1974

[54] COMPUTER TAPE SPROCKET DRIVE WITH 40 PERCENT PIN AND 60 PERCENT FRICTIONAL TRANSMISSION

[75] Inventors: Robert E. Yablonski, Orange; George S. Hager, Anaheim; William G. Campbell, Jr., Orange, all of Calif.

[73] Assignee: Electronic Engineering Co. of Calif., Santa Ana, Calif.

[22] Filed: Jan. 15, 1973

[21] Appl. No.: 323,567

[52] U.S. Cl............................. 74/243 R, 74/243 F
[51] Int. Cl............................................ F16h 55/40
[58] Field of Search ..... 74/243 F, 243 R; 29/159 R, 29/169.5; 226/96, 93

[56] References Cited
UNITED STATES PATENTS

| | | |
|---|---|---|
| 2,179,550 | 11/1939 | Frappier et al................... 74/243 F |
| 2,319,282 | 5/1943 | Woolf............................... 74/243 F |
| 2,556,930 | 6/1951 | Miller.............................. 74/243 F |
| 2,599,648 | 6/1952 | Lanegan........................... 74/243 F |
| 2,663,197 | 12/1953 | Metzner........................... 74/243 F |

FOREIGN PATENTS OR APPLICATIONS 710,170   1/1930   France............................. 74/243 F Primary Examiner—Samuel Scott
Assistant Examiner—Allan Russell Burke
Attorney, Agent, or Firm—Harry R. Lubcke

[57] ABSTRACT

A sprocket for translating perforated tape by means of a ring of pins and at least one cylindrical elastomer sleeve adjacent to the pins. Translational forces are exerted upon the perforations of the tape by the pins and upon one surface of the tape by contact with the elastomer. This structure gives a very much longer accurate tape life by reducing sprocket hole damage, particularly where frequent starts and stops are involved.

10 Claims, 4 Drawing Figures

COMPUTER TAPE SPROCKET DRIVE WITH 40 PERCENT PIN AND 60 PERCENT FRICTIONAL TRANSMISSION

BACKGROUND OF THE INVENTION

This invention pertains to sprockets for transporting perforated tape.

While the use of all-metal sprockets has long been known in the motion picture industry, and the use of rubber-covered cylinders as capstans for driving unperforated (sprocketless) tape and as pucks for driving phonograph turntables, a meaningful combination of sprocket teeth and an elastomer surface upon one drive means has apparently not been known.

Sprockets used in the motion picture industry have been relieved in the central portion of the cylindrical body, so that contact with the film there would be avoided. This was to prevent scratching the picture-carrying emulsion. Similarly, sprocket teeth upon capstans and pucks have been avoided as unnecessary and as likely to cause unwanted motional disturbances.

Prior to making the invention herein described, various expedients were tried. These included sandblasting the external surface of the sprocket cylinder, employing a soft metal for the same, and knurling the same. These were unsuccessful.

BRIEF SUMMARY OF THE INVENTION

The sought-for preservation of the dimensional integrity of the sprocket holes on the tape was attained when the outer cylindrical surface of the drum of the toothed sprocket was made of an elastomer, preferably a silicone rubber. The useful life of the tape was increased from 10 to 1,000 times over the life obtainable with the conventional all-metal sprockets. This is because the elastomer was found to provide over half of the driving force required for moving the tape.

The reduction of stress upon the sprocket holes is apparent. Ultimate failure of the tape was then typically due to cracking because of flexure and not to elongation of sprocket holes. The precision in positioning obtained by the use of the sprocket holes in the tape and the pins upon the sprocket was not decreased because of the assistance in driving the tape provided by the elastomer.

DESCRIPTION OF THE PREFERRED EMBODIMENTS

Figure 1:
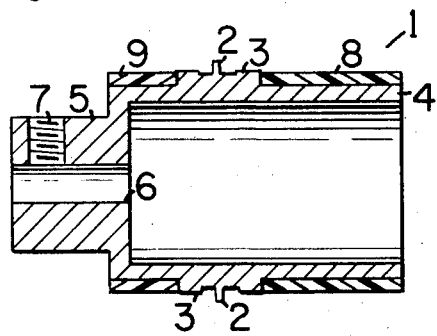
FIG. 1 is a sectional elevation view of a typical sprocket according to this invention.

In FIG. 1, numeral 1 generally indicates a sprocket according to this invention. In accordance with the established standard for perforated paper tapes a ring of sprocket pins 2 is formed, or otherwise rigidly attached, to the body of the sprocket in annular portion 3. This is to one side of the center of the sprocket according to the standard, but the invention is not limited to this configuration.

A hollow cylindrical drum portion 4 of the sprocket has a smaller diameter than annular portion 3 and typically extends in one piece to hub 5. The latter is normally provided with concentric bore 6 and a radially threaded hole 7 for receiving a set screw to attach the sprocket to an operating shaft for revolving it (not shown). The form of the hub or the means to rotate the sprocket are not significant to this invention.

The sprocket is normally formed of steel, so that pins 2 can be tempered; or of aluminum alloy, in which case the pins are heat-treated. This is to provide long wear. The body of the sprocket also shares in any tempering or treatment, but it is the pins that are of importance. An Electrolus nickel coating of approximately 0.001 inch thickness is also normally provided for further enhancing the wearing qualities and resistance to corrosion.

The invention is typically carried out by providing an elastomer outer surface upon drum 4 at essentially all areas not required for supporting pins 2. This conveniently takes the form of hollow elastomer cylinders 8 and 9, on the long and the short sides of the sprocket from the ring of pins, respectively. The elastomer may be cast in place after the sprocket is otherwise completed.

It has been determined that silicone synthetic rubber compositions have the highest coefficient of friction as employed in this work, and so are preferred. When suitably compounded, cylinders 8 and 9 of this material when employed in the configuration shown in FIG. 1 exercise approximately 60 percent of the translational force upon a perforated tape, while the pins exercise only approximately 40 percent of the translational force. This phenomenon accounts for the reduced wear of the sprocket holes in the tape according to this invention.

A specific embodiment employs the material ML6 of the Meridian Laboratory, Inc., of Madison, Wisconsin. This is a polyurathane compound. A particular hardness gives optimum results, which is 55 on the Shore 'A' hardness scale. A lower Shore hardness, a softer material, gave a higher coefficient of friction (stickiness), but deformed inward so that sprocket holes in the tape would be damaged by passing over the sprocket pins at a reduced radius, giving an incorrect pitch. A higher Shore hardness for the material did not grip the tape appreciably and so could not accomplish the hereinbefore stated result of providing over half of the translational force on the tape. The ML6 material is relatively smooth and durable. It is not tacky and will not attract foreign material. Preferably, it is cast upon sprocket drum 4, utilizing an accurately machined mold for the external surface. In this way the elastomer can be formed concentrically with the sprocket drum to 0.001 inch and grinding the outer surface of the elastomer is not required.

Should another process for applying the elastomer be used, or should the molding process chosen result in an unsatisfactory outer surface as to concentricity or texture, it can be ground true and smooth. This is accomplished by employing a bubble wheel on a cylindrical rotational grinder, using air as a coolant and a high surface speed for grinding.

Figure 4:
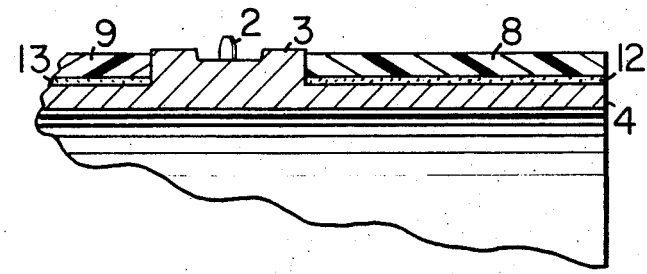
FIG. 4 is a fragmentary sectional elevation view of another alternate embodiment having a layer of adhesive between the sprocket drum and the elastomer.

Alternately, a thin layer of a suitable adhesive 12, 13 may be employed between the outer surface of drum 4 and the inner surfaces of the elastomer cylinders 8 and 9, respectively. This is shown in FIG. 4. A suitable adhesive for cementing silicone to the metal drum is a silastic sealant cement, such as the Dow-Corning RTV731.

While a silicone rubber may be preferred, other elastomers may be employed; such as a polyurathane compound, of which Adaprene by DuPont is an example. Also, the substance neoprene may be used. The criterion is that the material have a high coefficient of friction to the typically employed paper or paper-content tapes.

If an adhesive is required for these non-silicone compounds the process can be accomplished by using a primer, such as the Dow-Corning 1201, and a cement such as the Dow-Corning RTV731.

Figure 2:
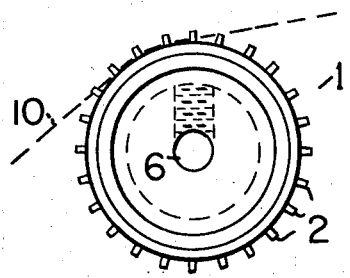
FIG. 2 is an end view of the same.
Figure 3:
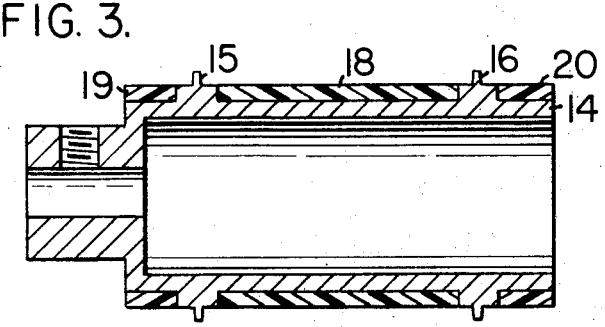
FIG. 3 is a sectional elevation view of an alternate embodiment having two rings of sprocket pins and three elastomer cylinders.

The tape-sprocket format illustrated in FIGS. 1, 2, 4 is for the more-or-less 1-inch wide standard tape. However, the invention is applicable to a wide range of embodiments, of which that shown in FIG. 3 is an example. This is for a nominal tape width of two inches. This width employs two rows of sprocket holes in the tape, requiring two rings of pins 15 and 16. These are spaced relatively near the edges of the tape, leaving a wide area between, where the major portion of data perforations are located.

The structure of sprocket drum 14 is similar to that of prior drum 4, with the exception of greater width, the two rings of sprocket pins, and possibly a larger diameter, with a correspondingly larger number of pins around the circumference.

Three elastomer cylinders; a central one 18 of major width, and two 19 and 20 of minor width, are normally employed. These flank the rings of pins and are formed and secured as before. In this embodiment some form of casting process is desirable for central cylinder 18, since this cannot be slipped onto drum 14, as is possible with cylinders 8 and 9 of FIG. 1.

There is, of course, no limit to the configuration, size, number of rings of pins, or number of elastomer cylinders that may be employed according to this invention. It is also possible to provide an elastomer cylinder for only a part of the exterior cylindrical surface of the sprocket and the metal of the drum for the other part. This might include elastomer cylinder 8 only for the embodiment of FIG. 1, or cylinder 18 only for the embodiment of FIG. 3. This could be for cost reduction in manufacturing, or for other reasons. The proportion of the drive by the elastomer rather than by the pins is proportional to the area of the elastomer in contact with tape 10.

It will be understood that some degree of wrap of the tape around the sprocket with some minimum tension is required so that the tape will definitely come in contact with the elastomer. These conditions are invariably met by the usual conditions required of installations of all-metal sprockets for proper engagement of the tape with the pins. As few as three sprocket pins in engagement with holes in the tape gives a satisfactory drive for the elastomer. A usual tension on the tape of the order of four ounces is also satisfactory.

The nature of the tape path, with the usual rollers adjacent to the sprocket in the usual installation provides sufficient wrap and tape pressure for this invention when the tape is formed in a loop and is running "free." When supply and take-up reels are used, tension arms are normally required and these certainly provide a suitable tension. Within the limits that can be handled by the tape itself there is no upper limit on the tension that can be exerted upon the elastomer cylinders. In passing, it may be noted that with the free-running tape it is the inertia of the tape itself that constitutes the retarding force upon the acceleration or deceleration of the tape.

It will be understood that maximum wear upon the sprocket holes in the tape occurs when it is rapidly accelerated and decelerated. This is the normal mode of operation in numerous applications, of which supplying data to a computer is one example. The computer is constituted to accept new data only when its circuits are not in use processing already acquired data. Acceptance may be for a relatively short interval, of the order of from several milliseconds to several hundred milliseconds. The tape device must thus rapidly respond to a command to operate and to as rapidly stop operation when the computer can no longer accept new data. Under these conditions it is usual that the tape be accelerated from rest to a translational velocity of 50 inches per second in 2 milliseconds, and similarly decelerated.

In certain tape readers employing a stepper type motor each row of data holes is read with a stop - start motion of the tape. Fifty percent of the movement cycle is available for reading the tape, with it stationary. Thereafter 30 percent of the cycle is employed for acceleration, and 20 percent for deceleration in bringing the tape to the next reading position.

In normal tape use under conditions of this nature, calculations show that the stress on the sprocket holes in the tape approaches three times the stress upon the sprocket holes in a 35 mm motion picture projector. Moreover, the tape sprocket holes are round, whereas film sprocket holes are rectangular. This causes the stress tending to elongate the sprocket holes in the tape to be several times that experienced upon the sprocket holes in the film. Thus, the stress at the extreme forward edge of the hole in the paper tape material may be 10 or more times greater than the stress upon the relatively long forward edge of the hole in motion picture film.

As is known in the paper tape art, elongation of the sprocket holes beyond about 34 percent of the radius of the hole on each side of it results in errors in reading the tape. This is because the tape becomes improperly longitudinally aligned with respect to the reading elements at the reading station. This type of tape failure has been characteristic of the prior art all-metal sprockets. With the improved sprocket of this invention the end of tape life is caused by rupture due to bending of the tape before the 34 percent elongation of the sprocket holes in the direction of motion is reached.

Laboratory tests to confirm the superior performance of the sprocket of this invention over that of an ordinary sprocket included very frequent stops and starts and pre-programmed reversals of the direction of motion of the tape. The tests were thus rigorous. However, the tape life was found to be greater by a factor lying within the range of from 10 to 1,000. The exact value of the factor depended upon the frequency of the stops and starts and upon the composition of the paper and/or paper-like material of the tape.

Other tests were made on a commercially operating wire-wrap machine for fabricating electronic circuits.

Here the sprocket of this invention gave a life to paper tape in excess of 10 times over that obtained with an otherwise equivalent all-metal sprocket which was replaced by the sprocket of this invention.

We claim:

1. A sprocket (1) for translating a perforated tape (10), comprising;
   a. a cylindrical drum (4)
   b. an annular flange (3) extending from said drum,
   c. a ring of pins (2) extending radially from said flange and extending around said flange,
   d. said drum having a cylindrical surface on each side of said flange, and
   e. an elastomer cylinder (8, 9) attached to each cylindrical surface and abutting said flange,
      the outer diameter of each elastomer cylinder being substantially the same.

2. The sprocket of claim 1, in which;
   a. there are two rings of pins (15, 16), and
   b. three elastomer cylinders (18, 19, 20) disposed adjacent to said two rings of pins.

3. The sprocket of claim 1, wherein;
   a. said elastomer cylinder is in intimate contact with said cylindrical drum.

4. The sprocket of claim 1, which additionally includes;
   a. a thin layer of adhesive disposed only between the outer cylinder surface of said drum (4) and the inner surface of said elastomer cylinder (8) for affixing said elastomer cylinder to said drum.

5. The sprocket of claim 1, in which;
   a. the outer surface of said elastomer cylinder (8) is a ground surface.

6. The sprocket of claim 1, in which;
   a. said elastomer is a silicone rubber.

7. The sprocket of claim 6, in which;
   a. said elastomer has a Shore A hardness of approximately 55.

8. The sprocket of claim 1, in which;
   a. said elastomer is a polyurathane compound.

9. The sprocket of claim 1, in which;
   a. said elastomer is a material having a high coefficient of friction to paper-content tape.

10. The sprocket of claim 1, in which;
    a. said cylindrical drum (4) is a hollow shell, and
    b. said elastomer cylinders are correspondingly thin, 7 whereby said sprocket has a relatively small moment of inertia.

* * * * *